United States Patent [19]
Iura et al.

[11] 3,988,748
[45] Oct. 26, 1976

[54] SINGLE LENS REFLEX CAMERA

[75] Inventors: Yukio Iura, Yokosuka; Takashi Uchiyama, Yokohama; Masayoshi Yamamichi, Kawasaki; Yukio Mashimo, Tokyo; Tetsuya Taguchi, Kawasaki, all of Japan

[73] Assignee: Canon Kabushiki Kaisha, Tokyo, Japan

[22] Filed: Dec. 20, 1974

[21] Appl. No.: 534,886

[30] Foreign Application Priority Data
Dec. 26, 1973 Japan............... 49-493252
Jan. 19, 1974 Japan............... 49-498898

[52] U.S. Cl.................... 354/29; 354/43; 354/51
[51] Int. Cl.².......................... G03B 7/14
[58] Field of Search............ 354/29, 30, 43, 51, 354/40

[56] References Cited
UNITED STATES PATENTS

| | | | |
|---|---|---|---|
| 3,704,656 | 12/1972 | Ogiso et al. | 354/43 X |
| 3,756,131 | 9/1973 | Kuramoto et al. | 354/51 |
| 3,777,637 | 12/1973 | Kuramoto et al. | 354/44 X |
| 3,829,867 | 8/1974 | Ono | 354/29 X |
| 3,899,789 | 8/1975 | Taguchi et al. | 354/30 |
| 3,909,833 | 9/1975 | Sorimachi et al. | 354/29 |

Primary Examiner—Joseph W. Hartary
Assistant Examiner—J. A. LaBarre
Attorney, Agent, or Firm—Toren, McGeady and Stanger

[57] ABSTRACT

A single lens reflex camera adjusted to a shutter preference exposure range in which responsive to the light sensor and preselected shutter speed, an Appex type computer derives an exposure value which is previously stored, and thereafter automatic adjustment of the diaphragm mechanism in accordance with the stored exposure value starts in substantial coincidence with the start of pivoting movement of the mirror from its viewing to non-viewing position which is followed by the operation of the shutter mechanism to thereby minimize the time interval between the time when the shutter button is depressed and the time at which the shutter is released from its cocked position.

10 Claims, 10 Drawing Figures

SINGLE LENS REFLEX CAMERA

BACKGROUND OF THE INVENTION

1. Field of the Invention

This invention relates to a single lens reflex camera provided with a shutter preference automatic exposure range, and more particularly to an improvement in the arrangement of the camera parts for controlling and correlating the operation of the diaphragm, mirror and shutter mechanisms.

2. Description of the Prior Art

The conventional type single lens reflex camera provided with a shutter preference automatic exposure range utilizes the pointer of the meter of the exposure control system in determining the value of the automatic diaphragm as the position of the deflected pointer of the meter is scanned by a scanning member when the camera is released by depression of the shutter button. In this arrangement, however, the operation of the scanning member and the introduction of the scanning result to the lens aperture mechanism are performed under the action of the shutter button. Therefore, a long stroke and strong depression force are required for the camera operator to depress the shutter button. In order for such a camera release manipulation to be rendered more adroit, recently a solution has been proposed in which the scanning member is coupled to the film winding mechanism to utilize a portion of the charge force applied to the film winding mechanism in adjusting the lens aperture mechanism in accordance with the position of the deflected pointer of the meter. This method is commonly called "charge type EE system." Because of the very strong charge force compared with the force necessary for the operation of the scanning member, the camera employing this charge type EE system necessitates the provision of a suitable buffering mechanism made in the coupling between the scanning member and the film winding mechanism, this complexity increasing the manufacture cost of the camera.

In addition to the unsatisfactory manipulation for the camera release operation, the conventional arrangement of the camera parts has an additional disadvantage in that the lens aperture mechanism is actuated after the scanning result has been introduced to the diaphragm control mechanism therefor, and in subsequence to the completion of automatic adjustment of the lens aperture mechanism, the shutter mechanism is actuated in timed relation to the mirror mechanism. Such a sequential control of actuation of these various mechanisms takes an undesirably long time until an exposure of the film is initiated. The need for highly efficient control and correlation of the operation of these various mechanisms exists for rapid access to photographic situation.

THE SUMMARY OF THE INVENTION

An object of the invention is to overcome the above-mentioned conventional drawbacks and to provide an improved single lens reflex camera which can initiate an exposure of the associated photographic film after a shorter time interval from the actuation of the shutter button and which permits the camera operator to depress the shutter button by a weaker pressure of a finger than were previously possible, this improvement rendering the camera more suitable for use in many snap photography application.

Another object of the invention is to provide an automatic exposure control circuit for controlling actuation of the diaphragm control mechanism and the shutter mechanism of such a single lens reflex camera.

The invention both as to its construction and its method of operation together with additional objects and advantages thereof will become apparent from the following description of a specific embodiment of the invention and some variations thereof when read in connection with the accompanying drawings in which:

DESCRIPTION OF THE PREFERRED EMBODIMENTS

Figure 1:
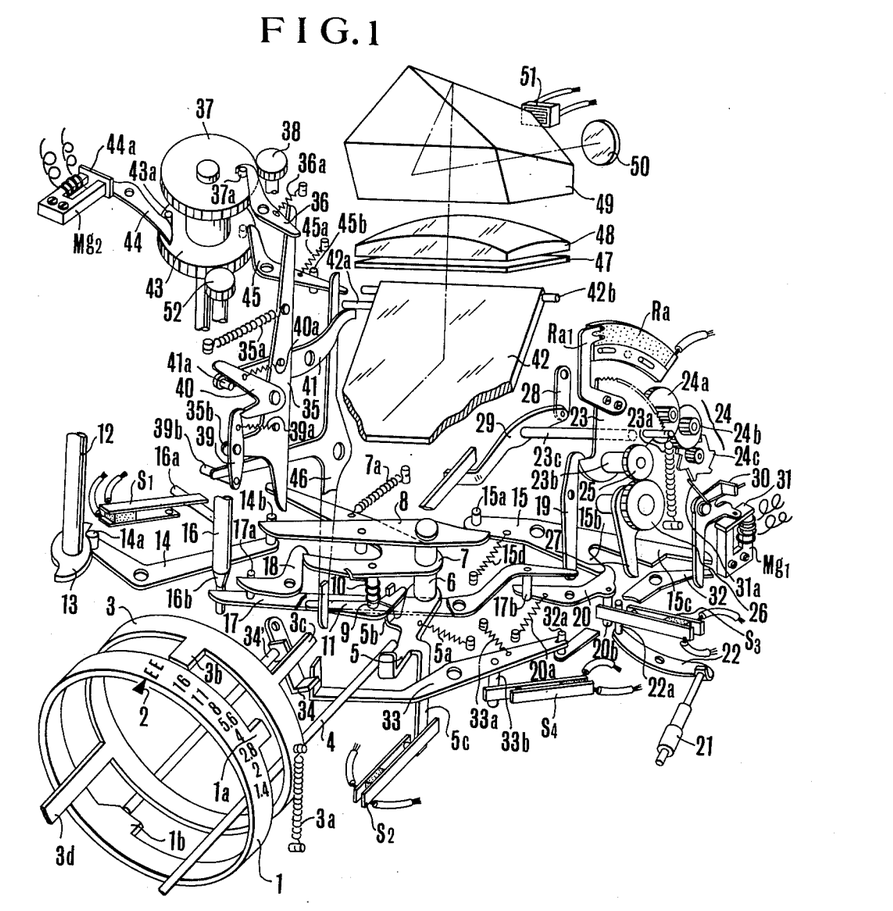
FIG. 1 is a schematic exploded perspective illustration of one embodiment of a structure of a single lens reflex camera according to the invention in a normal position following an exposure with the film winding mechanism in its charged position.
Figure 3:
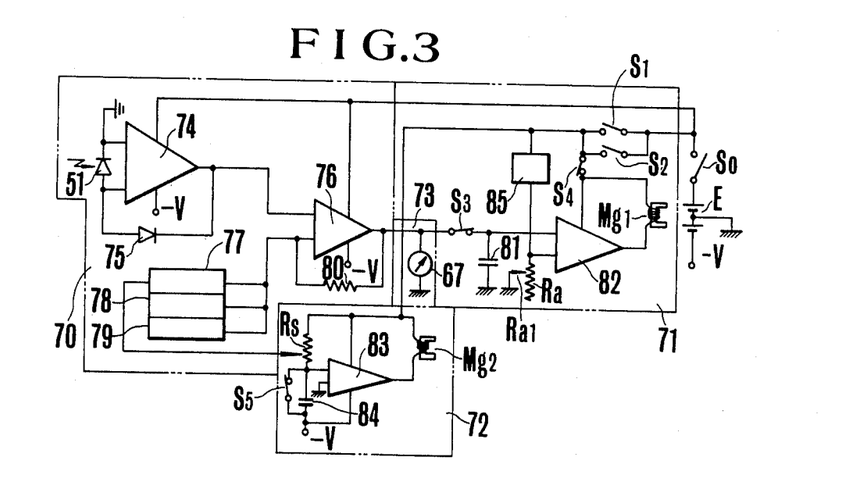
FIG. 3 is a schematic diagram illustrating a first example of one embodiment of an automatic exposure control circuit according to the invention adapted for incorporation in the camera of FIG. 1.

Referring to FIG. 1, a single lens reflex camera constructed in accordance with one embodiment of the invention is shown essentially comprising a lens aperture mechanism mounted in an individual interchangeable objective lens barrel, a diaphragm control mechanism for automatically adjusting the lens aperture mechanism to a preselected or photometrically determined setting, a mirror mechanism movable between viewing and non-viewing positions, a shutter mechanism for making an exposure, an actuating mechanism for the diaphragm, mirror and shutter mechanisms associated with the circuit of FIG. 3, and a film winding mechanism for advancing the film one frame at a time for exposure, each of which will now be described.

The lens aperture mechanism comprises a manually rotatable diaphragm preselecting ring 1 having cut thereon a symbol EE corresponding to the shutter preselection automatic exposure range and a diaphragm scale corresponding to the diaphragm preselection automatic exposure range which symbol and scale graduations each can be brought into registry with a stationary index 2, and having a stop lug 1a and cam lobe 1b, and an automatically rotatable diaphragm presetting ring 3 which is biased by a spring 3a in a clockwise direction and which has a lug 3b movable into engagement with the stop lug 1a. The diaphragm presetting ring 3 is provided with first and second arms 3c and 3d which rearwardly and forwardly extend parallel to the optical axis of the objective lens respectively, the position of second arm 3d determining the position of a not shown bell crank member through a not shown cam ring which in turn determines the amount of movement of a not shown drive ring member for a diaphragm blade assembly when it is actuated, thereby the opening area of aperture is adjusted in conformance to the manually preselected or photometrically determined setting of the ring 3. The drive ring member has a pin 4 fixedly mounted thereon and extending parallel to the optical axis of the objective lens into the diaphragm control mechanism.

The diaphragm control mechanism comprises an operable lever 5 engageable with the pin 4 and pivoted about a shaft 6, the lever 5 having a perpendicularly downwardly extending arm 5c arranged to operate a normally open switch or hold switch $S_2$, and a spring powered drive member 7 in the form of an angular lever movably mounted at its apex on the shaft 6 and which is pretensioned by a spring 7a which urges lever 7 to move clockwise. The lever 7 is provided with buffer means comprising a two-armed lever 11 pivotal about a pin 9 mounted on an almost central portion of the left arm of lever 7 and a spring 10 acting on the center of lever 11 to effect an abutting engagement of one arm of lever 11 with a perpendicularly upwardly extending arm 5b of the operable lever 5. This mechanism further includes an escapement 15 in the form of a three-armed lever which is biased by a spring 15d in a counter-clockwise direction and which when the camera reset mechanism to be described later is operated serves as a resetting member for the diaphragm presetting ring 3 through an intermediary including a gear sector 23 which is biased by a spring 23a in a clockwise direction, a gear 25 fixedly mounted on sector 23 in coaxial relation thereto and meshing with another gear 26, an arm 27 extending from gear 26 and engaging at the free end with one arm 15c of escapement 15, and a diaphragm presetting ring control lever 29 connected at its center through an eccentric pin 23c to sector 23 and having the free end on which the arm 3c of ring 3 rindes under the force of spring 3a. In order to photometrically determine the setting position of the ring 3, there are provided a variable resistor $R_a$ incorporated in the automatic exposure control circuit as shown in FIG. 3 and of which the slider $R_{a_1}$ is fixedly mounted on the gear sector 23, and a gear train 24 operatively associated with arresting means comprising a pawl lever 30 which has an iron piece 31 fixedly mounted thereon to cooperate with an electromagnet $Mg_1$ and which is biased by a spring 31a in a counter-clockwise direction so that when the electromagnet $Mg_1$ is deenergized, the pawl of lever 30 is brought into engagement with one of the teeth of stop wheel 24c, thereupon the gear train 24 is arrested to determine the final position of the diaphragm presetting ring 3 through sector 23 and control lever 29. The gear train 24 functions as a governor for the sector 23.

To switch the diaphragm control mechanism between the automatic diaphragm exposure range and the diaphragm preselection exposure range, there is provided with a change-over mechanism comprising a detent pin 34' provided in the objective lens barrel to acts as a cam follower for the cam lobe 1b, the other end abutting a lug of a lever 34, and a transfer lever 33 which is biased by a spring 33a in a counter-clockwise direction and having two lever ends one of which is rectangularly bent to engage the bent end portion of lever 34, and another end which has a recess in which is engaged a pin 32a fixedly mounted on one end of a two-armed clamp lever 32, and a pin 33b mounted on one arm of lever 33 and arranged to close a normally open switch $S_4$ in the automatic diaphragm exposure range. The other end of lever 32 is positioned adjacent the tail of the arresting pawl lever 30, so that when the switch $S_4$ is opened for exposure in the manual diaphragm exposure range, the deenergization of electromagnet $Mg_1$ does not cause the lever 30 to arrest the gear train 24.

The mirror mechanism includes a mirror 42 pivotally mounted on stub shafts 42b and arranged between the objective lens and two-curtain type focal plane shutter. The mirror 42, in its viewing position as shown in FIG. 1, reflects light entering through the objective lens upward onto a focusing screen 47 where an image of the object area to be photographed is formed. Light from the image on the screen 47 is radiated upward through a condensor lens 48 into the bottom face of a pentaprism 49. The prism 49 reflects the light entering the bottom face thereof to an eyepiece 50 positioned behind the exit face of prism 49. Also a photocell element 51 such as a silicon blue cell incorporated in the sensor circuit of FIG. 3 is positioned adjacent the prism 49 to receive that light from a predetermined area of the image. The mirror 42 is movable between its viewing and non-viewing positions by a control lever 41 pivotally mounted and having a lug at one end for moving one end of a rod 42a riding thereon, the opposite end of rod 42a being affixed to the mirror 42. The mirror mechanism further includes a spring powered drive member 35 in the form of a three-armed lever which is pretensioned by a spring 35a which urges the lever 35 to move counter-clockwise, a transfer lever 40 mounted on a pivot axis constituting a common pivot axis of the lever 35 and which is biased by a spring 40a in a clockwise direction, and a pawl lever 39 pivotally mounted on one arm of lever 35 and arranged with its pawl being engageable with the end of one arm of lever 40. The other arm of lever 40 provides a cam surface for sliding engagement with a cam follower pin 41a mounted on the opposite end of lever 41 to the lug provided for sliding movement of rod 42a, so that when the lever 40 is latched by the pawl of lever 39 the motion of lever 35 is transmitted through a lever 40 and a pin 41a connection to the control lever 41 and therefrom to the mirror 42 through the lever 41 and rod 42a connection. The spring 35a urges the downwardly extending arm of lever 35 to abuttingly engage the right arm of the spring powered actuating member 7 for the drive ring member of the lens aperture mechanism so that the lever 35 serves as an actuating member for the mirror mechanism. In order for the mirror 42 to return from its non-viewing position to its viewing position and for the diaphragm blade assembly to be set to its wide-open position immediately after an exposure has been completed, there is provided a three-armed lever 46, the upwardly extending arm of which reaches in the path of movement of one arm of lever 45 connected to a spring 45a which urges the arm of lever 45 against a stop pin 45b in a counter-clockwise direction and arranged to be striked at the other arm by a pin 43a mounted on a rear curtain control gear 43 of the shutter mechanism when the running down of the rear curtain is completed, the forwardly extending arm of which engages a pin 39b mounted on the tail of pawl lever 39, so that when the lever 46 is turned counter-clockwise, the transfer lever 40 is released from the pawl lever 39 to return the mirror 42 to its viewing position, and the other downwardly extending arm which engages one arm of the lever 11 so that when the lever 46 is turned counter-clockwise, the operable lever 5 is turned counter-clockwise under the force of spring 5a to permit the diaphragm blade assembly to be automatically set to its wide-open position.

Figure 5:
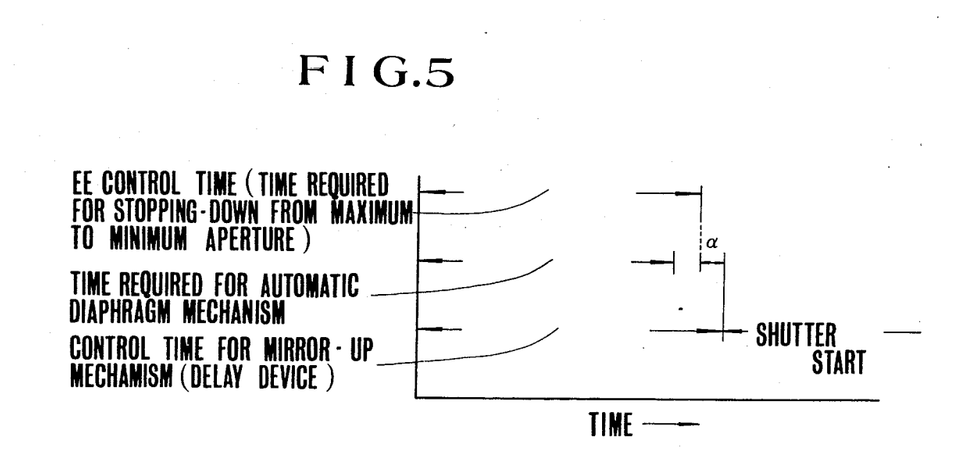
FIG. 5 is a timing chart illustrating the manner in which the actuating mechanism of the camera shown in FIGS. 1 through 3 operates the shutter mechanism in timed relation to the diaphragm control mechanism.

The shutter mechanism comprises a focal plane shutter having front and rear curtains not shown which are controlled by gears 37 and 43, respectively, coaxially mounted on a common spindle and meshing with pinions 38 and 52, respectively, fastened on the shafts of front and rear curtain drums not shown. The gears 37 and 43 are held by front and rear curtain latches in the form of pawl levers 36 and 44 respectively in the cocked position of the shutter in engagement of their pawls with detent pins 37a and 43a respectively mounted on the gears 37 and 43. The pawl lever 36 is biased by a spring 36a to tend the tail of lever 36 to move into engagement with the upwardly extending arm of the mirror drive lever 35, so that the lever 35 serves as an actuating member for the shutter mechanism in cooperation with a not shown retard device which controls the start of movement of the front curtain as time-displaced by an interval, α, with respect to the termination of duration of the time interval necessary for the diaphragm control mechanism to set the diaphragm blade assembly from its maximum open position to the minimum open position as shown in FIG. 5. The rear curtain latch, or pawl lever 44 has at its tail an iron piece 44a cooperating with the solenoid of a second electromagnet $Mg_2$ incorporated in the shutter control circuit of FIG. 3.

The actuating mechanism includes a shutter button not shown connected to a shaft 16. The shaft 16 carries a pin 16a radially extending to operate a switch $S_1$ into its closed state when the shutter button is depressed, and is tapered at its bottom end portion 16b to transmit a downward movement of shaft 16 to a counter-clockwise movement of a release lever 17 of which one end extends to abuttingly engage the tapered portion 16b of shaft 16. The lever 17 is adapted to release three latch levers 18, 19 and 20 through a pin 17a fixedly mounted thereon, the opposite lever lend thereof to that engaging the tapered portion 16b and a pin 17b fixedly mounted thereon respectively, the first and second latch levers 18 and 19 being arranged to be engageable with one arm of lever 7 and the arm of sector 23 respectively. The third latch lever 20 is biased by a spring 20a in a counter-clockwise direction to latch the escapement 15 in the cocked position, and it is arranged to operate a normally closed switch $S_3$ into the open state each time the shutter button is depressed. This switch $S_3$ is further provided with an operable member comprising a pivotal lever 22 having at one end a pin 22a fixedly mounted thereon and arranged to engage the movable contact of switch $S_3$ and having at the other end a projection engaging an actuating member 21 which is movably mounted in the camera housing so as to be actuable from the outside thereof for the purpose of retaining a once stored photometric value until another new photometering result is positively stored in the diaphragm control circuit of FIG. 3.

The film winding mechanism includes a shaft 12 having a cam disc 13 coaxially mounted on the bottom end thereof for operating a reset mechanism for the camera. This reset mechanism comprises a bell crank lever 14 having at one end a pin 14a fixedly mounted thereon and arranged to serve as a follower pin for the cam disc 13. The lever 14 has at the other end a pin 14b fixedly mounted thereon and arrange to be engageable with one end of an intermediate lever 8 pivoted at the shaft 6. The lever 8 has the other end engageable with a pin 15a fixedly mounted on the escapement 15 and a pin mounted at a center portion thereof and extending between the two arms of lever 7, so that when the lever 8 is turned in the counter-clockwise direction by the bell crank lever 14, the lever 7 and escapement 15 are turned in the counter-clockwise and clockwise directions respectively until they are latched by the levers 18 and 20 respectively. Such clockwise movement of escapement 15 causes the arm 27 to turn in the clockwise direction until the arm of sector 23 is latched by the lever 19.

Figure 2:
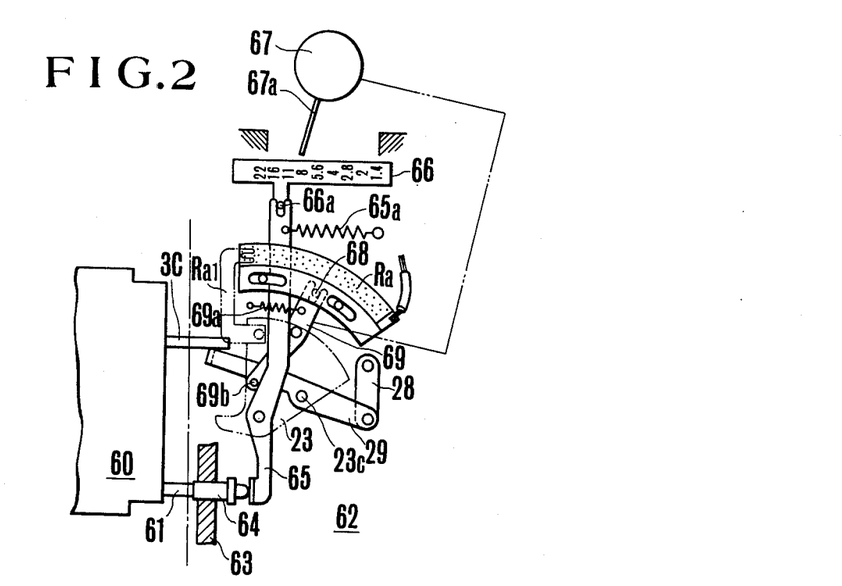
FIG. 2 is a fragmentary schematic side view of the camera of FIG. 1 illustrating an arrangement of the diaphragm value display device.

In FIG. 2, there is shown a differential mechanism for introducing into the diaphragm control mechanism a corrective factor representing different specific relative apertures of individual interchangeable objective lenses. This mechanism is adapted for incorporation in the camera of FIG. 1 and comprises a corrective pin 61 fixedly mounted in the objective lens barrel 60 which carries the diaphragm preselecting and setting rings 1 and 3 of FIG. 1. When the barrel 60 with an objective lens having a specific relative aperture is attached to the camera body 62 while the corrective pin 61 mating with a pin receiver 64 movably mounted in the front panel 63 of the camera housing, the receiver 64 is displaced from its initial advanced position by a distance dependent upon the specific relative aperture of the lens, while turning a pivotal lever 65 in a counter-clockwise direction as viewed in FIG. 2 against the force of a spring 65a which tends to urge one end of lever 65 against the rear protrude of receiver 64, the opposite end of lever 65 having two fingers between which a pin 66a fixedly mounted on a movable diaphragm scale carrier 66 extends for adjusting the position of diaphragm scale calibrated as from 1.4 to 22 in accordance with the relative aperture of the lens with respect to a light meter 67. The housing of meter 67 is rotatably mounted in the camera housing and is operatively connected through a suitable linkage indicated by dashed lines to a control lever 69 to establish a predetermined relationship between the scale 66 and the pointer 67a of meter 67. The arrangement of scale 66 and pointer 67a can be viewed by the camera operator looking through the viewfinder of the camera. The control lever 69 is pivotally mounted in the camera housing, and a spring 69a is connected therebetween which urges a pin 69b fixedly mounted on one end of lever 69 to sliding engagement with one side of lever 65 so that the movement of lever 65 is transmitted to lever 69. The other end of lever 69 has two fingers between which a pin 68 mounted on the support of the variable resistor Ra of FIG. 1 extends so that the position of resistor Ra relative to its slider $Ra_1$ fixedly mounted on sector 23 is adjusted in accordance with the amount of displacement of receiver 64, namely, the specific relative aperture of the lens in the barrel 60. As is further evident from FIG. 2, the sector 23 is connected to the arm 3c of the diaphragm presetting ring 3 through the eccentric pin 23c, control lever 29 and supporting arm 28.

An automatic exposure control system adapted for use in the camera of FIGS. 1 and 2 is shown in FIG. 3 wherein the same reference characters as those in FIGS. 1 and 2 indicate similar or like parts. The system comprises a photometer circuit 70, diaphragm control circuit 71, shutter control circuit 72, each of these circuits 70, 71 and 72 being connected to a positive bus connected through a power switch $S_0$ to the positive terminal of an electric power source or battery E, and a diaphragm display circuit 73 connected between the ground and the interconnection between circuits 70 and 71.

The photometer circuit 70 includes a sensor element 51 such as silicon blue cell, an amplifier 74 connected between the positive and negative buses and having first and second input terminals connected across element 51, a compression log diode 75 connected in the feedback network of amplifier 74, and an operational amplifier for Appex computation which includes an amplifier 76 connected between the positive and negative buses and having a first input terminal connected to the output terminal of amplifier 74, and a feedback resistor 80, the second input terminal of amplifier 76 being connected to a plurality of exposure control parameter setting circuits 77, 78, and 79, namely, shutter speed setting circuit 77, film speed setting circuit 78, and corrective factor setting circuit 79. The output of operational amplifier 76, 80 is applied both to an electric indicator 67 constituting the diaphragm display circuit 73 and to the input of the diaphragm control circuit 71.

The diaphragm control circuit comprises a condensor 81 connected in the input circuit thereof to serve as a memory means for storing the photometric value in the form of a voltage derived from photometer circuit 70, and a comparator 82 having a first input terminal connected through switch $S_3$ to the output terminal of operational amplifier 76, 80 and having a second input terminal connected to an interconnection between a constant voltage circuit 85 and the variable resistor Ra. The comparator 82 is connected to the positive bus through the switch $S_4$ and either of the switches $S_1$ and $S_2$ connected in parallel between the switch $S_4$ and the positive bus. The output of comparator 82 is applied to the first electromagnet $Mg_1$.

The shutter control circuit 72 comprises a Schmitt type trigger circuit 83 connected between the positive and negative buses through either of switches $S_1$ and $s_2$ and a timing circuit containing a variable resistor Rs which also acts as a fixed load resistor through which the first input terminal of circuit 83 is connected to the positive bus, and a condensor 84 across which a start switch $S_5$ is connected. The variable resistor Rs cooperates with the shutter speed setting circuit 77 to contribute to the timing circuit Rs, 84 different resistance values with different selected shutter speeds. The second input terminal of the trigger circuit 83 is grounded. The output terminal of circuit 83 is applied to the second electromagnetic $Mg_2$.

Figure 4:
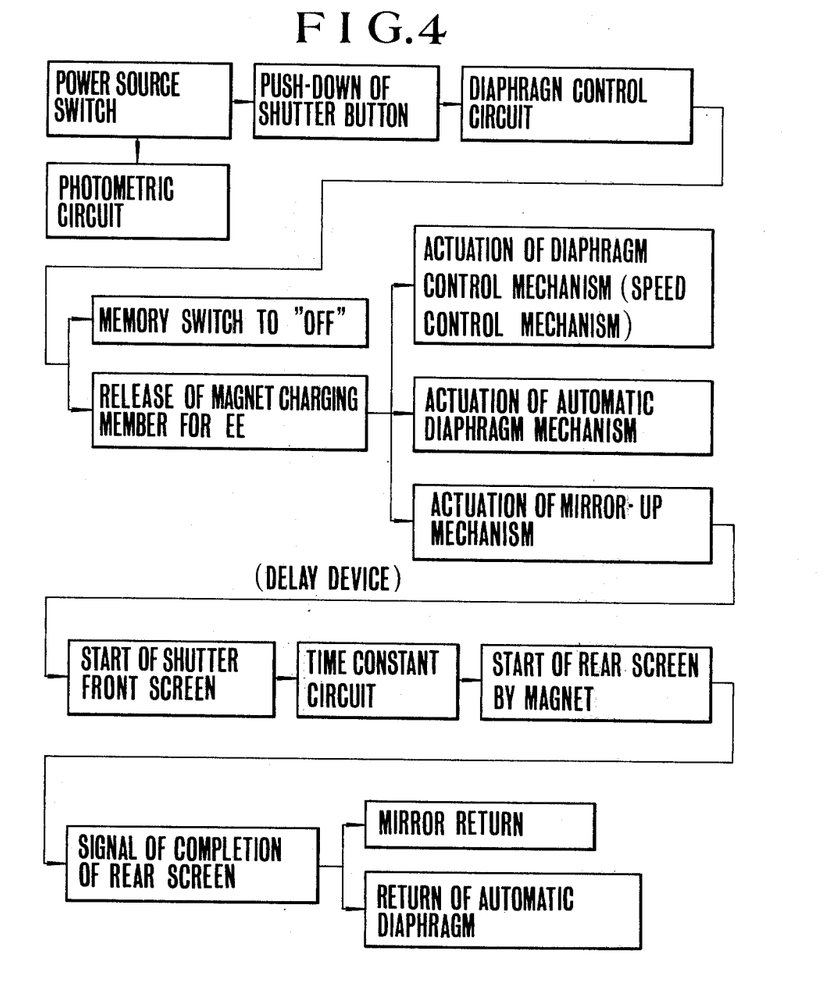
FIG. 4 is a block diagram illustrating the control and correlation of operation of the various camera parts shown in FIGS. 1 through 3.

The operation:

An interchangeable objective lens having a relative aperture is selected, and its barrel 60 is attached to the camera body 62, while the corrective pin 61 mating with the pin receiver 64, thereby the receiver 64 is retracted through a distance dependent upon the relative aperture, while moving the lever 65 of the differential mechanism in the counter-clockwise direction against the force of spring 65a to adjust the position of the scale carrier 66 of the display device. At the same time, the control lever 69 is caused to turn clockwise under the force of spring 69a through the lever 65 and pin 69b connection, so that the position of the variable resistor Ra relative to its slider $Ra_1$ is adjusted in accordance with the relative aperture of the lens. Also, the angular position of the housing of meter 67 is adjusted in accordance therewith. The following description will be better understood when read by reference to FIG. 4.

In order to make an exposure in the shutter preference exposure range, the camera operator turns the diaphragm ring 1 to place symbol EE in registry with the index 2 as shown in FIG. 1, causing the cam follower pin 34' to ride on the cam lobe 1b, so that the change-over mechanism (32, 33, 34) operates causing the closure of normally open switch S4 as well as the release of lever 30 from its clamped position by clamp lever 32. Next, the power switch $S_0$ (FIG. 3) is manually closed to render at first the photometer circuit 70 operative, and then the camera is aligned with an object to be photographed, a portion of the light entering through the objective lens in barrel 60 is received by a sensor element 51 positioned behind the pentaprism 49. The sensor element 51 responsive to the level of brightness of the object provides an output signal which after having been compressed by the logarithmic convertor 74, 75 is applied to the first input of operational amplifier 76, 80. Responsive to the signals from the logarithmic convertor 74, 75, and the various exposure control parameter setting circuits 77, 78 and 79, the operational amplifier 76, 80 performs Appex computation to derive an output voltage representative of an effective diaphragm aperture which is indicated by the indicator 67 of display circuit 73. At the same time, the output voltage of the operational amplifier 76, 80 is applied through the normally closed switch $S_3$ both to condensor 81 on which it is stored and to the first input of comparator 82. When the shutter button is depressed about a half of its entire stroke, the pin 16a moves downwardly to close switch $S_1$, thereupon the comparator 82 produces an output which energizes the first electromagnet $Mg_1$ to maintain the disengagement of lever 30 from stop sheel 24c against the force of spring 30a in the event that all prerequisites for adjusting the lens aperture mechanism are not fulfilled, and simultaneously the Schmitt type trigger circuit 83 produces an output which energizes the second electromagnet $Mg_2$ causing the latch lever 44 to latch the rear curtain control gear 43, thereby the rear curtain is held in a tensioned position. The further depression of the shutter button causes the tapered portion 16b to actuate the release lever 17, thereby the first, second and third latch levers 18, 19 and 20 simultaneously operate to release respective arresting members 7, 23 and 15 from their arrested positions as depicted in the timing chart of FIG. 4.

As the third latch lever 20 moves clockwise, switch $S_3$ is opened so that the output voltage of operational amplifier 76, 80 is stored on condensor 81 and the escapement 15 moves counter-clockwise under the force of spring 15d so that the arm 15c is moved away from the paths of travel of rest arm 27 and arresting lever 30.

As the second latch lever 19 moves counter-clockwise, its pawl is disengaged from the arm of sector 23, permitting sector 23 to move clockwise under the force of spring 23a as well as under the force of spring 3a connected to the diaphragm presetting ring 3 by an angular distance which is photometrically determined by the photometer circuit 70. Such turning movement of sector 23 causes a sliding movement of slider $Ra_1$ on resistor Ra while varying the resistance value of the variable resistor assembly Ra and $Ra_1$. When one of the every varying resistance values as detected by comparator 82 has reached a predetermined level, the output of comparator 82 disappears to deenergize the solenoid of electromagnet $MG_1$, thereupon the arresting lever 30 is turned in the counter-clockwise direction to arrest the stop wheel 24c from rotation. This turning movement of sector 23 also causes a downward movement of the control lever 29 which in turn causes a clockwise movement of diaphragm presetting ring 3, thereby the final angular position of ring 3 is determined to introduce the photometric result to the lens aperture mechanism in which the opening of diaphragm aperture is adjusted in conformance with the brightness level of the object as sensed by the sensor element 51, the preselected shutter speed, the sensitivity of the used film and the exposure corrective factor specified therefor.

As the first latch lever 18 moves counter-clockwise, the spring powered drive lever 7 together with the operating lever 5 operatively connected thereto through a buffer lever 11 move clockwise to close switch $S_2$, while moving the pin 4 to operate the diaphragm blade drive ring of the lens aperture mechanism, thereby the diaphragm aperture is varied from the maximum opening to the opening of the effective diaphragm aperture as photometrically determined. In response to the clockwise movement of lever 7, the mirror drive lever 35 is actuated for movement in the counter-clockwise direction under the force of spring 35a, thereby the mirror control lever 41 is turned counter-clockwise in cooperation with lever 40 which is moving in fixed relation to the lever 35, while moving the mirror 42 from its viewing position to its non-viewing position. After the termination of pivoting movement of mirror 42 and after a time interval required for the lens aperture mechanism to be automatically set from the fully open position corresponding to the maximum available aperture opening to the closed position corresponding to the minimum avilable aperture opening, the lever 35 cooperating with a retard device not shown further turns in the same direction to strike the tail of pawl lever 36, thereupon the release pin 37a of gear 37 is released from the pawl of lever 36, causing gear 37 to turn counter-clockwise while rotating pinion 38 meshing therewith to effect the running-off of the front curtain. The running-off of the front curtain operates the start switch $S_5$ in a manner known in the art. In a time interval determined by a timing circuit Rs, 84, the Schmitt type trigger circuit 83 is actuated to deenergize the solenoid of electromagnet $Mg_2$, thereby the release pin 43a is disengaged from latch 44 permitting the rear curtain control gear 43 to rotate counterclockwise, while rotating pinion 52 meshing therewith, causing the rear curtain to run down to terminate the exposure. At the termination of rotation of gear 43, the release pin 43a strikes one arm of actuating lever 45 causing the lever 46 to turn counter-clockwise. Such turning movement of lever 46 causes a counter-clockwise movement of pawl lever 39 to result in disengagement of the pawl of lever 39 from lever 40, thereupon the lever 40 turns clockwise under the force of spring 40a, causing the mirror control lever 41 and mirror 42 to return to their initial positions under the force of a not shown return spring. Such pivoting movement of lever 46 also causes buffer lever 11 to turn clockwise so that the lever 5 returns into its initial position under the force of spring 5a, while being followed by the pin 4 to set the diaphragm blade assembly to the fully open position.

After the exposure has been completed, the film winding mechanism may be operated to advance the film one frame as well as to cock the shutter. As the film winding shaft 12 moves counter-clockwise, the cam 13 and pin 14a connection causes a clockwise movement of bell crank lever 14 which in turn moves the intermediate lever 8 in the counter-clockwise direction, thereby the lever 7 and escapement 15 are brought into engagement with the first and third latch levers 18 and 20 respectively. The counter-clockwise movement of the lever 7 causes levers 35 and 46 to return to their initial positions, thereby lever 40 is brought into engagement with the lever 39. The clockwise movement of escapement 15 causes the reset lever 27 to turn in the clockwise direction, while moving the sector 23 counterclockwise through the gear assembly 25 and 26 until the second latch lever 19 engages the arm of sector 23 and, at the same time, the arresting lever 30 is caused to turn clockwise against the force of spring 31a. As a result, all of the shutter diaphragm and mirror mechanisms are reset to their cocked positions.

In order to make a number of exposures in sequence with the initially once determined photometric value being unchanged, the operator has to operate the EE lock button 21, thereby switch $S_3$ is set to the open position.

In order to make an exposure in the manual diaphragm exposure range, the camera operator turns the diaphragm ring 1 to place a selected diaphragm value graduation on the diaphragm ring 1 in registry with index 2, the cam lobe 1b is moved away from pin 34' causing a counter-clockwise movement of transfer lever 33 under the force of spring 33a which in turn moves clamp lever 32 in the clockwise direction to clamp the arresting lever 30 and to set switch $S_4$ to the open position. Next, the power switch $S_0$ is closed, the photometric circuit 70 is rendered operative as in the shutter preselection exposure range. When the shutter button is depressed, the switch $S_1$ is closed by pin 16a, thereupon the trigger circuit 83 energizes the solenoid of second electromagnet $Mg_2$ to hold the rear curtain control gear 43 in the cocked position. In this case, because of the opening of switch $S_4$, the diaphragm control circuit 71 is not rendered operative. Further, depression of the shutter button causes the release lever 17 to turn counter-clockwise, thereby the first, second and third latch levers 18, 19 and 20 are simultaneously released. As the third latch lever 20 moves clockwise, the escapement 15 is released to rotate counter-clockwise under the force of spring 15d with its arm moving away from the path of travel of the lever 27. As the second latch lever 19 moves counter-clockwise, the sector 23 is released to rotate clockwise under the force of spring 23a, causing the control lever 29 to move downwardly, thereby the diaphragm presetting ring 3 is turned in the clockwise direction under the force of spring 3a until the lug 3d of ring 3 abuts the stop lug 1a of ring 1 to determine the final position of the bell crank member of the diaphragm blade drive ring. As the first latch lever 17 moves counter-clockwise, the drive lever 7 is released to operate the diaphragm blade drive ring, thereby the diaphragm blade assembly is set from its fully open position to a position corresponding to the preselected diaphragm value. The drive lever 7 further operates the mirror and shutter mechanism in timed relation to each other in the same manner as in the shutter preselection exposure range.

Figure 6:
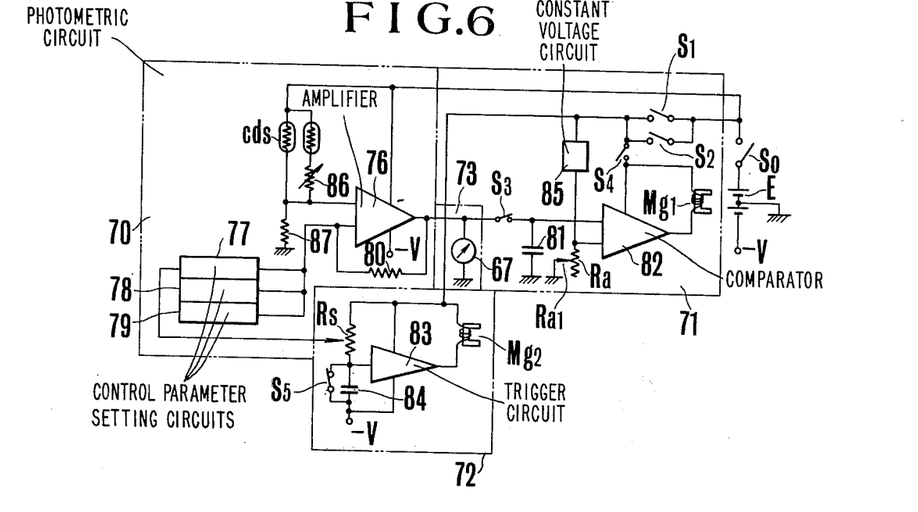
FIG. 6 is a schematic diagram of a second example of the embodiment of FIG. 3 in which a three terminal CdS photocell is used as the photosensitive element.

The invention has been described above in connection with a schematic example which of course can be changed in many ways. For example, as shown in FIG. 6, instead of using the two-terminaled sensor element 51, it is possible to use a three-terminaled CdS photocell assembly with a variable resistor 86 and a fixed resistor 77 each connected as a bias resistor to the first input terminal of amplifier 76.

Figure 7:
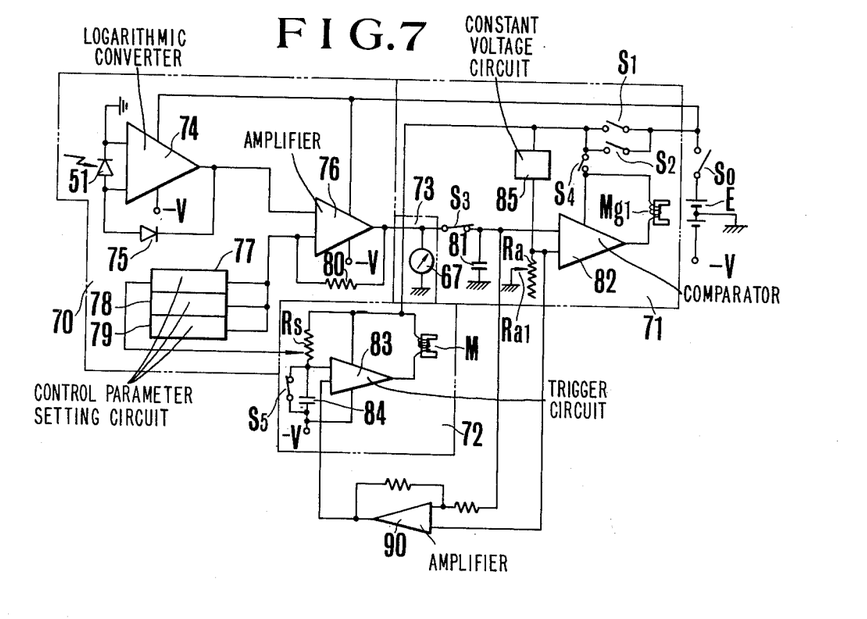
FIG. 7 is a schematic diagram of a third example of the embodiment of FIG. 3 varied as further including a shutter speed readjusting circuit.

FIG. 7 shows a modification of the circuit of FIG. 3 as further including a feedback circuit connected between the diaphragm and shutter control circuits 71 and 72 upon detection of a difference between the actual diaphragm aperture setting as determined by variable resistor Ra, Ra$_1$ and the true setting as determined by the photometric value stored in the memory condensor 81 to automatically vary the preselected shutter interval so as to effect an equivalent exposure. Responsive to the difference between the voltage across the condensor 81 and the voltage across the variable resistor Ra, Ra$_1$, an amplifier 90 arranged therein as an error detector derives an output voltage which is applied to the second input terminal of the Schmitt type trigger circuit 83, thereby the reference level of the circuit 83 is varied so that the shutter control circuit 72 produces a compensated shutter interval.

Figure 8:
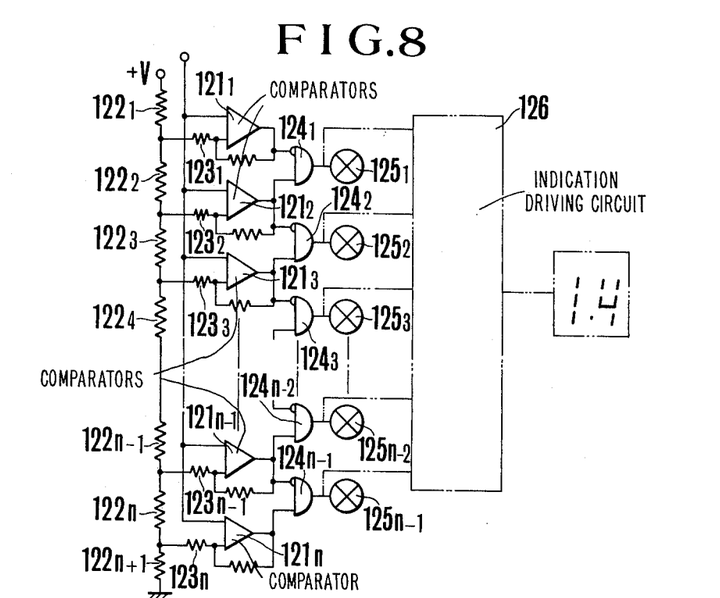
FIG. 8 is a schematic diagram of a first variation of the display circuit suitable for use in block 73 of FIG. 3.
Figure 9:
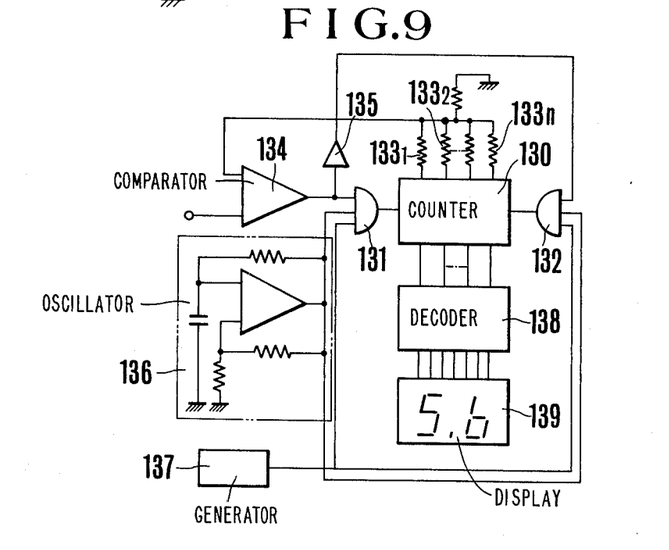
FIG. 9 is a schematic diagram of a second variation of the display circuit.
Figure 10:
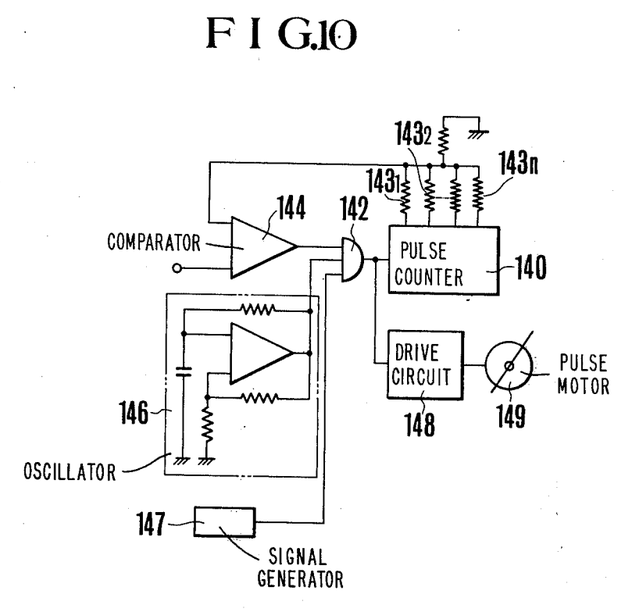
FIG. 10 is a schematic diagram of a third variation of the display circuit.

Moreover, instead of using a galvanometer 67 as the indicator of display circuit 73, it is possible to use other devices as shown in FIGS. 8, 9 and 10. The device of FIG. 8 comprises $n$ number of comparators 121 of which the first input terminals each are connected to the memory condensor 81, and having second input terminals to which respective reference voltages are applied from a voltage divider comprising ($n+1$) number of resistors 122 successively connected in series to each other through respective input resistors 123, ($n-1$) number of AND circuits of which the first gates are successively connected to respective output terminals of comparators 121$_1$, 121$_2$ ..., 121$_{n-1}$ of which the second gates are successively connected to the respective outputs terminals of comparators 121$_2$, 121$_3$ ...., 121$_n$, and ($n-1$) number of lamps connected to the respective output terminals of the AND circuits 124 to display respective diaphragm values 22, 16 ... and 1.4. In operation, if a voltage stored in the memory condensor 81 is equal to the reference voltage of comparator 121$_{n-1}$, the two successive comparators 121$_{n-2}$ and 121$_{n-1}$ produce 1 outputs, and the other comparators 121$_1$, 121$_2$ .... 121$_{n-3}$ produce 0 outputs, so that only the AND gate produces output to illuminate the indication lamp and it can be observed that the diaphragm is 1.4. Also the output signals of the AND circuits 124, 124$_2$....124$_{n-1}$ may be added to the indication driving circuit 126 so as to effect digital indication by the output of the circuit 126.

In FIG. 9, there is shown another device comprising a comparator 134 having a second input connected to the output of the operational amplifier 76, 80 and having a first input connected to a reversible counter 130 through $n$ number of resistors 133 connected in parallel with one another, first and second AND gates 131 and 132 having second inputs connected to an oscillator 136 and each having a gating control input connected to a generator 137 which generates signals during the time when the photometer circuit 70 is operative. The first input of first AND gate 131 is directly connected to the output of comparator 134, while the first input of second AND gate 132 is connected through a "not" circuit 135 to the output of comparator 134. The outputs of first and second AND gates 131 and 132 are connected to the reversible counter 130 so that the output of first AND gate 131 causes positive count, while the output of the second AND gate 132 causes negative count. The output of counter 130 is connected through a decoder 138 to a display section 139. In operation, when the photometer circuit is rendered operative, the generator 137 produces signals which are applied to the gating control inputs of first and second AND gates 131 and 132, while the output from the oscillator 136 is applied to the second inputs of AND gates 131 and 132, so that when the output from the operational amplifier 76, 80 is higher than the level at the second input of comparator 134, the comparator 134 produces a 1 output which is applied to the first AND gate 131. At this time, applied through the "not" circuit 135 to the second AND gate 132 is the output of comparator 134, thereby the output of the first AND gate 131 is applied to the counter 130 to effect a positive count which in turn causes counter 130 to apply a signal corresponding to the counted result to the first input of comparator 134. Such sequence repeats itself until the level at the first input of comparator 134 reaches the level of the second input thereof. When the former exceeds the latter, the comparator 134 produces 0 output, so that the output of the second AND gate 132 is applied to counter 130 to effect a negative count. The counter 130 finally produces an output corresponding to the output of operational amplifier 76, 80 which is then applied through the decoder 138 to the display section in which the corresponding diaphragm value is displayed. When the photometer circuit 70 is rendered inoperative, the generator 137 produces O signal which is applied to the first and second AND gates 131 and 132, thereby the display section 139 displays the last counting result in the form of digits.

In FIG. 10, there is still another device comprising a comparator 144 having a second input connected to the operational amplifier 76, 80, and having a first input connected to a pulse counter 140 through $n$ number of resistor 143 connected in parallel with one another, an AND gate 142 having a first input connected to the output of comparator 144, having a second input connected to an oscillator 146 and having a gating control input connected to a signal generator 147. The output of AND gate 142 is connected both to the pulse counter 140 and to a pulse motor 149 through a drive circuit 148 therefore. The amount of rotation of pulse motor 149 is employed to display the corresponding diaphragm value. In operation, when the photometer circuit 70 is rendered operative, the generator 147 generates a start signal which is then applied to the gating control input of AND gate 142. Because of the initially higher level at the second input of comparator 144 than that at the first input thereof, the comparator 144 produces an output which is applied to the AND gate 142. The output of the AND gate 142 is applied both to the pulse counter 140 and to the pulse motor drive circuit 148 which in turn drives the motor 149 for rotation until the level at the second input of comparator 144 reaches the level at the first input thereof. Upon coincidence of the levels at the first and second input, the comparator 144 produces no output so that the pulse motor 149 is stopped from rotation, thereby the photometering results is displayed by the needle associated with the pulse motor 149.

It will be appreciated from the foregoing detailed description of the preferred embodiments that the present invention provides a single lens reflex camera provided with a shutter preselection exposure range and constructed so that when the camera is adjusted to the automatic diaphragm exposure range, the diaphragm control operation and mirror-up operation are correlated to start almost simultaneously to minimize the time interval between the time when the shutter button is depressed and the time at which the movement of the shutter starts, thereby giving an advantage of using the camera in many snap photography application.

Another advantage deriving from the use of a first operational amplifier for performing a function of logarithmically compressing information representative of the objective brightness which is electrically combined with information representative of other exposure control parameters by a second operational amplifier for providing an exposure control signal which after stored in memory means actuates a comparator adapted to control the period of actuation of a camera control mechanism is that with highly accurate automatic exposure control, a photographic film can be exposed uniformly throughout an extended range of object brightness while minimizing the influence of ambient temperature variation.

Still another advantage deriving from the use of the mechanical governor in introducing the photometering result into the diaphragm mechanism is that a large proportion of the electric power which would be consumed by the electromagnet in the otherwise constructed camera structure can be saved, thereby giving an additional advantage of increasing the life-time of the governor and electromagnet.

A further advantage is that the increased accerralation of speed of the governor assists in increasing the accuracy of exposure control. A further more advantage is in the provision of the EE lock button for retaining a once stored photometric value until another photometric value is positively stored.

What is claimed is:
1. A single lens reflex camera with an automatic exposure control system comprising in combination;
   an objective lens with a lens aperture device,
   photometer means responsive to a portion of the light entering through said objective lens and said lens aperture device and providing an output corresponding thereto,
   exposure control parameter setting means, said setting means including manually operable means for setting a preselected shutter speed said setting means providing an output relating to the exposure control parameter setting;
   a computer responsive both to the output of said photometer means and to the output of said exposure control parameter setting means to derive an exposure value in the form of an electrical signal having a certain magnitude,
   memory means responsive to said computer for storing said exposure value related electrical signal of said computer,
   a diaphragm control mechanism operatively associated with said lens aperture device to control the opening area of aperture of said lens aperture device in accordance with the magnitude of the electrical signal stored in said memory means,
   a mirror mechanism with a mirror movable between viewing and non-viewing positions,
   first and second drive means operatively connected to each other for operating said diaphragm control mechanism and said mirror mechanism respectively,
   an actuating mechanism for actuating said first drive means to effect substantially simultaneous initiation of operation of said diaphragm and said mirror mechanism, and
   a shutter mechanism automatically adjustable in accordance either with the preselected shutter speed set in said shutter speed setting means or with the magnitude of said electrical signal and actuable in automatic response to the movement of said second drive means to begin the operation of the shutter mechanism in timed relation to said diaphragm control mechanism and said mirror mechanism and wherein said lens aperture device has variable diaphragm blade means and diaphragm presetting means operatively associated with each other, while said diaphragm control mechanism is provided with automatically operable means for said variable diaphragm blade means and with control means for said diaphragm presetting means arranged to be movable from its normal position in response to an initiation of operation of said actuating mechanism, whereby the position of said diaphragm presetting means is adjusted by said control means in accordance with the magnitude of the electrical signal stored in said memory means, and said diaphragm blade means moved from its wide-open position in substantially simultaneous relation to the actuation of said diaphragm presetting means to define an aperture opening dependent upon the final position of said diaphragm presetting means and wherein diaphragm control mechanism including a variable resistor associated with said control means for providing varying resistance values as said control means is moved from its normal position, a comparator connected between said variable resistor and said memory means for comparing each of the signal levels proportional to the varying resistance values of said variable resistor with the level of the signal stored in said memory means, and arresting means connected to the output of said comparator upon coincidence of the level of a signal from said variable resistor with a reference level dependent upon the level of the signal stored in said memory means to arrest the moving control means at a point in the path of movement thereof which in turn determines the final position of said diaphragm presetting means and further including a detector connected between said memory means and said variable resistor to detect a difference between the level of the signal stored in said memory means and the level of a signal from said variable resistor when the control means is arrested by said arresting means, said difference being introduced to said shutter mechanism, whereby the preselected shutter speed is varied to make a correct exposure despite the fact that the actual aperture opening is deviated from the value corresponding to the exposure value derived by said computer.

2. A single lens reflex camera with an automatic exposure control system comprising:
   a diaphragm device having a diaphragm and a diaphragm presetting means for determining the opening of the diaphragm;
   means for adjusting the diaphragm presetting of the diaphragm presetting means;
   means for measuring the light transmitting through a photographing lens of full open diaphragm, said means generating an electrical signal corresponding to the light transmitting through the photographing lens;
   memorizing means for memorizing the output of the diaphragm computing means;
   shutter time setting means which is manually settable and generates an electrical signal corresponding to the set shutter time;
   diaphragm computing means for computing the electrical signal output of the light measuring means and the electrical signal output of the shutter time setting means;
   level setting means for generating an electrical signal corresponding to the adjustment of the adjusting means;
   comparison means for comparing the memory level of the memorizing means with the output level of the level setting means;
   lock means for locking the adjusting means when both output levels of the comparison means reach prescribed value;
   diaphragm driving means for driving stop-down of the diaphragm; and
   starting means for actuating simultaneously the diaphragm driving means and the adjusting means, said starting means operating in association with the camera release.

3. A camera according to claim 2, in which the level adjusting means has a variable resistor which is set in a value corresponding to the adjustment of the adjusting means.

4. A camera according to claim 2, in which the lock means has an electromagnet and an engagement member which clamps the adjusting means by the release of attraction of the electromagnet.

5. A camera according to claim 2, which further comprises means for indicating the output value computed by the computing means.

6. A camera according to claim 2, in which the light measuring means comprises a photo-electromotive element which receives the transmission light of the photographing lens and an operation amplifier having compression function.

7. A camera according to claim 2, in which the computing means is an operation amplifier.

8. A camera according to claim 2, in which the memorizing means is a condensor.

9. A camera according to claim 2, which further comprises means for holding the memory value of the memorizing means, said holding means operating manually.

10. A camera according to claim 2, which further comprises switch means which makes non-operative the comparison means, and manual diaphragm setting means which makes the switch means "OFF," said setting means regulating the operation of the diaphragm presetting means on the basis of its set value.

* * * * *

UNITED STATES PATENT OFFICE
CERTIFICATE OF CORRECTION

Patent No. 3988748　　　　　　　　　Dated October 26, 1976

Inventor(s) Yukio Iura et al

It is certified that error appears in the above-identified patent and that said Letters Patent are hereby corrected as shown below:

In the heading of the Patent [30] should read as follows:

--[30]　Foreign Application Priority Data
      December 26, 1973　Japan......　49-3252
      January 19, 1974　Japan......　49-8898--.

Signed and Sealed this

Twenty-second Day of March 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3988748                            Dated July 11, 1977

Inventor(s) Yukio Iura et al

It is certified that error appears in the above-identified patent and that said Letters Patent are hereby corrected as shown below:

In Claim 2, cancel lines 13 and 14, which presently state:

"memorizing means for memorizing the output of the diaphragm computing means;"

and insert the canceled lines following line 19 of Claim 2. Thus, lines 21 and 22 will read:

"memorizing means for memorizing the output of the diaphragm computing means;"

Signed and Sealed this

Twenty-ninth Day of November 1977

[SEAL]

Attest:

RUTH C. MASON  
Attesting Officer

LUTRELLE F. PARKER  
Acting Commissioner of Patents and Trademarks